US009731976B2

(12) United States Patent
Gerhart et al.

(10) Patent No.: US 9,731,976 B2
(45) Date of Patent: *Aug. 15, 2017

(54) METHOD FOR THE PRODUCTION OF AMMONIA FROM AN AMMONIA PRECURSOR SUBSTANCE IN ORDER TO REDUCE NITROGEN OXIDES IN EXHAUST GASES

(75) Inventors: Christian Gerhart, Siegsdorf (DE); Thomas Sattelmayer, Erding (DE); Plamen Toshev, Unterschleißheim (DE)

(73) Assignee: ALZCHEM AG, Trostberg (DE)

( * ) Notice: Subject to any disclaimer, the term of this patent is extended or adjusted under 35 U.S.C. 154(b) by 31 days.

This patent is subject to a terminal disclaimer.

(21) Appl. No.: 14/129,390

(22) PCT Filed: Jun. 29, 2012

(86) PCT No.: PCT/EP2012/062752
§ 371 (c)(1),
(2), (4) Date: Dec. 26, 2013

(87) PCT Pub. No.: WO2013/004630
PCT Pub. Date: Jan. 10, 2013

(65) Prior Publication Data
US 2014/0127100 A1    May 8, 2014

(30) Foreign Application Priority Data

Jul. 1, 2011  (DE) .................. 10 2011 106 233
Jul. 1, 2011  (DE) .................. 10 2011 106 237
Jul. 1, 2011  (DE) .................. 10 2011 106 243

(51) Int. Cl.
*C01C 1/04* (2006.01)
*C01C 1/08* (2006.01)
(Continued)

(52) U.S. Cl.
CPC .............. *C01C 1/04* (2013.01); *B01D 53/565* (2013.01); *B01D 53/90* (2013.01); *B01D 53/92* (2013.01);
(Continued)

(58) Field of Classification Search
CPC . B01D 53/8621–53/8631; B01D 53/92; B01D 53/94–53/9431; B01D 53/565;
(Continued)

(56) References Cited

U.S. PATENT DOCUMENTS 6,444,177 B1 *  9/2002  Muller et al. ................. 422/177
6,482,382 B1    11/2002  Gam et al.
(Continued)

FOREIGN PATENT DOCUMENTS

CN  101568371   10/2009
DE  4038054    6/1992
(Continued)

OTHER PUBLICATIONS

Machine English Translation of DE4203807.*
(Continued)

*Primary Examiner* — Anthony J Zimmer
(74) *Attorney, Agent, or Firm* — Kilpatrick Townsend & Stockton LLP

(57) ABSTRACT

The present invention relates to a method for generating ammonia from an ammonia precursor substance and to the use thereof for reducing nitrogen oxides in exhaust from industrial facilities, from combustion engines, from gas engines, from diesel engines or from petrol engines.

17 Claims, 4 Drawing Sheets

(51) Int. Cl.
*F01N 3/20* (2006.01)
*B01D 53/90* (2006.01)
*B01D 53/94* (2006.01)
*B01D 53/92* (2006.01)
*B01D 53/56* (2006.01)
*B01J 8/04* (2006.01)

(52) U.S. Cl.
CPC ..... *B01D 53/9409* (2013.01); *B01D 53/9431* (2013.01); *C01C 1/08* (2013.01); *C01C 1/086* (2013.01); *F01N 3/2066* (2013.01); *B01D 2251/2067* (2013.01); *B01D 2251/21* (2013.01); *B01D 2255/808* (2013.01); *B01D 2255/902* (2013.01); *B01J 8/0496* (2013.01); *F01N 2240/25* (2013.01); *F01N 2610/02* (2013.01); *F01N 2610/10* (2013.01); *Y02P 20/52* (2015.11); *Y02T 10/24* (2013.01)

(58) Field of Classification Search
CPC ............... B01D 53/90; B01D 53/9409; B01D 2255/808; B01D 2255/902; B01D 2251/21; C01C 1/04; C01C 1/08; C01C 1/086; F01N 3/2066; F01N 2610/10; F01N 2610/02; F01N 2240/25; Y02P 20/52; B01J 8/0496; Y02T 10/24
See application file for complete search history.

(56) References Cited

U.S. PATENT DOCUMENTS

| | | | |
|---|---|---|---|
| 6,928,807 | B2 | 8/2005 | Jacob et al. |
| 7,178,329 | B2 * | 2/2007 | Bertiller ................ B01D 53/90 60/286 |
| 7,682,586 | B2 | 3/2010 | Harold et al. |
| 8,153,072 | B2 | 4/2012 | Klingberg |
| 8,155,509 | B2 | 4/2012 | Brück et al. |
| 9,315,391 | B2 | 4/2016 | Gerhart et al. |
| 2004/0040288 | A1 | 3/2004 | Jacob et al. |
| 2005/0013756 | A1 | 1/2005 | Amou et al. |
| 2006/0153748 | A1 | 7/2006 | Huthwohl et al. |
| 2007/0048204 | A1 * | 3/2007 | Mital .......................... 423/239.1 |
| 2008/0050297 | A1 * | 2/2008 | Harold et al. ............. 423/239.1 |
| 2008/0148717 | A1 | 6/2008 | Ohshima et al. |
| 2008/0314027 | A1 | 12/2008 | Barber et al. |
| 2009/0127511 | A1 | 5/2009 | Bruck et al. |
| 2009/0324453 | A1 | 12/2009 | Harinath et al. |
| 2010/0047144 | A1 | 2/2010 | Hammer et al. |
| 2011/0008228 | A1 | 1/2011 | Hammer et al. |
| 2014/0147356 | A1 | 5/2014 | Gerhart et al. |
| 2014/0147410 | A1 | 5/2014 | Ghosh et al. |
| 2014/0150410 | A1 | 6/2014 | Gerhart et al. |

FOREIGN PATENT DOCUMENTS

| | | |
|---|---|---|
| DE | 4203807 | 8/1993 |
| DE | 4230056 | 3/1994 |
| DE | 19960976 | 7/2001 |
| DE | 102006023147 | 1/2008 |
| DE | 102007019460 | 11/2008 |
| DE | 102007033424 | 1/2009 |
| DE | 102009042386 | 3/2010 |
| EP | 487886 | 6/1992 |
| EP | 586913 | 3/1994 |
| EP | 0586913 | 3/1994 |
| EP | 1052009 | 11/2000 |
| EP | 1338562 | 8/2003 |
| EP | 1348840 | 10/2003 |
| EP | 1481719 | 12/2004 |
| EP | 1647324 | 4/2006 |
| JP | 2006170013 | 6/2006 |
| JP | 2008267269 | 11/2008 |
| JP | 2009062860 | 3/2009 |
| RU | 2192388 | 11/2002 |
| WO | 9944939 | 9/1999 |
| WO | 2008077587 | 7/2008 |
| WO | 2008077588 | 7/2008 |

OTHER PUBLICATIONS

English translation of Zhao et al., "Application of Urea Pyrolysis to Prepare Ammonia in SCR Denitrification", Thermal Power Generation, vol. 38, Issue 8, pp. 65-67, 2009.
Zhao et al., "Application of Urea Pyrolysis to Prepare Ammonia Technology into SCR Denitrification", Thermal Power Generation, vol. 38, Issue 8, pp. 65-67, 2009.
U.S. Appl. No. 14/129,402 , "Non-Final Office Action" dated Jan. 5, 2015, 22 pages.
DE4230056 , "English translation of German Patent Application No. DE 4230056 A1 (Mar. 10, 1994)".
International Patent Application No. PCT/EP2012/062750 , "International Search Report", Aug. 9, 2013, 7 pages.
International Patent Application No. PCT/EP2012/062752 , "International Search Report", Aug. 9, 2013, 6 pages.
International Patent Application No. PCT/EP2012/062757 , "International Search Report", Aug. 9, 2013, 6 pages.
Final Office Action for U.S. Appl. No. 14/129,402, mailed on Jul. 29, 2015 (20 pages).
Written Opinion of the International Searching Authority for PCT/EP2012/062750, mailed Jan. 1, 2014 (5 pages for the original document and 6 pages for the English translation).
Written Opinion of the International Searching Authority for PCT/EP2012/062757, mailed Jan. 1, 2014 (4 pages for the original document and 7 pages for the English translation).
Written Opinion of the International Searching Authority for PCT/EP2012/062752, mailed Jan. 1, 2014 (5 pages for the original document and 7 pages for the English translation).
German Patent Application No. DE102011106233.9, "Office Action," Apr. 30, 2012, (5 pages for the original document and 5 pages for the English translation).
German Patent Application No. DE102011106237.1, "Office Action," Mar. 30, 2012, (5 pages for the original document and 5 pages for the English translation).
German Patent Application No. DE102011106243.6, "Office Action," Mar. 28, 2012, (5 pages for the original document and 5 pages for the English translation).
International Patent Application No. PCT/EP2012/062750, "International Search Report," Aug. 9, 2013, 7 pages.
International Patent Application No. PCT/EP2012/062752, "International Search Report," Aug. 9, 2013, 6 pages.
International Patent Application No. PCT/EP2012/062757, "International Search Report," Aug. 9, 2013, 6 pages.
Notice of Allowance in U.S. Appl. No. 14/129,378, mailed Nov. 3, 2015, 8 pages.
Non-Final Office Action in U.S. Appl. No. 14/129,402, mailed Nov. 5, 2015, 24 pages.
U.S. Appl. No. 14/129,402, "Notice of Allowance", mailed Mar. 3, 2016, 8 pages.

* cited by examiner

METHOD FOR THE PRODUCTION OF AMMONIA FROM AN AMMONIA PRECURSOR SUBSTANCE IN ORDER TO REDUCE NITROGEN OXIDES IN EXHAUST GASES

PRIOR RELATED APPLICATIONS

This application is a National Phase application of International Application No. PCT/EP2012/062752 filed Jun. 29, 2012, which claims priority to German Patent Application No. 102011106237.1, filed Jul. 1, 2011, German Patent Application No. 102011106243.6, filed Jul. 1, 2011, and German Patent Application No. 102011106233.9, filed Jul. 1, 2011, each of which is incorporated herein by reference in its entirety.

The present invention relates to a method for generating ammonia from an ammonia precursor substance and to the use thereof in exhaust treatment systems for reducing nitrogen oxides in exhaust.

The exhaust of internal combustion engines often contains substances of which the release into the environment is undesirable. Therefore, many countries set limits which have to be adhered to on the release of these pollutants, such as in the exhausts of industrial facilities or automobiles. These pollutants include nitrogen oxides ($NO_x$), such as in particular nitrogen monoxide (NO) or nitrogen dioxide ($NO_2$), as well as a range of other pollutants.

The release of these nitrogen oxides from the exhaust of combustion engines can be reduced in various ways. At this point, emphasis should be placed on reduction by way of additional exhaust treatment measures, in particular based on selective catalytic reduction (SCR). What these methods have in common is that a reducing agent which acts selectively on the nitrogen oxides is added to the exhaust, the nitrogen oxides thus being converted in the presence of a corresponding catalyst (SCR catalyst). This converts the nitrogen oxides into substances which are less harmful to the environment, such as nitrogen and water.

One reducing agent for nitrogen oxides which is already used nowadays is urea ($H_2N$—$CO$—$NH_2$), which is added to the exhaust in the form of an aqueous urea solution. In this context, the urea in the exhaust stream may break down into ammonia ($NH_3$), for example as a result of the action of heat (thermolysis) and/or a reaction with water (hydrolysis). The ammonia which is thus formed is the actual reducing agent for nitrogen oxides.

Exhaust treatment systems for automobiles have been developed for some time, and this is discussed in numerous publications. Thus for example European Patent EP 487 886 B1 discloses a method for selective catalytic $NO_x$ reduction in oxygen-containing exhaust of diesel engines, in which urea and the thermolysis products thereof are used as reducing agents. In addition, a device for generating ammonia in the form of a tubular evaporator is disclosed, and comprises a spraying device, an evaporator comprising an evaporator tube, and a hydrolysis catalyst.

Further, European patent EP 1 052 009 B1 discloses a method and a device for carrying out the method for thermal hydrolysis and metering of urea or urea solutions in a reactor with the aid of a partial exhaust stream. In the method, a partial stream of the exhaust is removed from an exhaust line upstream from the SCR catalyst and passed through the reactor, the partial stream, which is loaded with ammonia after the hydrolysis in the reactor, likewise further being passed back into the exhaust line again upstream from the SCR catalyst.

In addition, European patent EP 1 338 562 B1 discloses a device and method which make use of the catalytic reduction of nitrogen oxides by ammonia. In this context, the ammonia is obtained from urea in solid form under flash thermolysis conditions and from isocyanic acid by hydrolysis, and supplied to the exhaust stream of a vehicle.

Further, European patent application EP 1 348 840 A1 discloses an exhaust purification system in the form of an assembly, which can be transported as a whole unit, in the form of a 20-foot container. The system is operated in such a way that a urea or ammonia solution is injected into the exhaust stream directly by means of an injection device. The nitrogen oxides contained in the exhaust are reduced on an SCR catalyst.

Further, German patent application DE 10 2006 023 147 A1 discloses a device for generating ammonia which is part of an exhaust treatment system.

In addition, international applications WO 2008/077 587 A1 and WO 2008/077 588 A1 disclose a method for the selective catalytic reduction of nitrogen oxides in exhausts of vehicles by means of aqueous guanidinium salt solutions. This method uses a reactor which generates ammonia from the aqueous guanidinium salt solutions.

Even though ammonia gas generators have been known for some time, thus far the technology has not been implemented in a vehicle or any other application. Thus far, the concept of direct injection of an ammonia precursor substance into the exhaust stream of an internal combustion engine has been pursued, this ammonia precursor substance being broken down into the actual reducing agent in the exhaust stream by suitable measures. However, as a result of incomplete decomposition or secondary reactions of decomposition products in the exhaust line, depositions are always observed, and damage the catalysts and filters which are also present in the exhaust line.

Therefore, an object of the present invention is to provide a method for generating ammonia which overcomes these drawbacks of the prior art. A further object of the present invention is to provide a method which can be carried out by means of simple equipment-related measures, provides a high conversion rate of ammonia precursor substances into ammonia gas, and makes long-term use without maintenance possible.

These objects are achieved by a method according to claim 1 of the present invention.

Thus, in accordance with a first configuration, the subject matter of the present invention is a method for continuously generating ammonia from a solution of an ammonia precursor substance by means of an ammonia gas generator, which method comprises a catalyst unit, which comprises a catalyst for decomposing and/or hydrolysing ammonia precursor substances into ammonia and a mixing chamber upstream from the catalyst in the flow direction, the catalyst being of a catalyst volume $V_{Kat}$ and the mixing chamber being of a mixing chamber volume $V_{Misch}$, in which method the solution of the ammonia precursor substance is introduced into the mixing chamber in such a way that the end face loading of the catalyst is 0.2 to 15 g/(h*cm$^2$). More particularly, the solution of the ammonia precursor substance is injected into the mixing chamber by means of a nozzle.

At this point, it should be emphasised that the ammonia gas generator used in the method according to the present invention is a separate unit for generating ammonia from ammonia precursor substances. A unit of this type may for example be used for reducing nitrogen oxides in industrial exhausts or for exhaust treatment of exhaust from combustion engines, such as diesel engines. This ammonia gas generator may also operate independently or be operated using lateral exhaust streams, although in any event nitrogen oxides are not reduced by means of ammonia until a subsequent process step. If an ammonia gas generator according to the invention is used as a separate component in an exhaust treatment system of a combustion engine, for example of a diesel engine, the nitrogen oxides in the exhaust stream can thus be reduced without introducing further catalysts for breaking down ammonia precursor substances or other components into the exhaust stream itself. The ammonia produced using the ammonia gas generator according to the invention can thus be introduced into the exhaust stream as required. A potential decrease in the service life of the SCR catalyst due to impurities in the form of depositions, for example of ammonia precursor substances or decomposition products of ammonia precursor substances, is also prevented.

Thus, according to the invention, ammonia is in particular generated from an ammonia precursor substance in an ammonia gas generator as a separate unit. This ammonia, and not the ammonia precursor substance, is subsequently introduced into an exhaust stream, for example so as to bring about reduction of nitrogen oxides therein. The ammonia formed in the method according to the invention is preferably supplied to an exhaust at a point downstream from a combustion engine, and in particular at a point downstream from an oxidation catalyst. Further, the ammonia produced according to the invention is in particular supplied to an exhaust stream upstream from an SCR catalyst.

An ammonia gas generator according to the present invention in particular comprises a catalyst unit, which in turn comprises a catalyst for decomposing and/or hydrolysing ammonia precursor substances into ammonia and a mixing chamber upstream from the catalyst in the flow direction, the catalyst being of a catalyst volume $V_{Kat}$ and the mixing chamber being of a mixing chamber volume $V_{Misch}$, an injection device for introducing the solution of the ammonia precursor substance into the mixing chamber and an outlet for the ammonia gas which is formed. In particular, an ammonia gas generator further comprises an inlet for a carrier gas which particularly preferably generates a tangential carrier gas stream with respect to the solution injected into the mixing chamber.

In conjunction with the present invention, it is essential to the invention that the end face loading of the catalyst is in the range of 0.17 g/(h*cm$^2$) to 15 g/(h*cm$^2$), more particularly of 0.2 to 15 g/(h*cm$^2$). It has specifically been found to be vital to the fault-free and thus deposition-free operation of an ammonia gas generator that only a certain quantity of solution is permitted to be finely distributed on a given catalyst end face in a defined time period (quantity flow, metering amount). The impact and first contact with the frontmost part of the catalyst (catalyst end face) is decisive for the complete decomposition of the ammonia precursor. In this case, the end face loading is independent of the type of ammonia precursor substance used, or of the solution thereof.

It has further been found that the ratio of metering amount to catalyst end face has to be in a range of 0.17 to 15 g/(h*cm$^2$), more particularly of 0.2 to 15 g/(h*cm$^2$), such that excessively rapid cooling on the catalyst end face is prevented, which stops an excessively low conversion to ammonia. The end face loading is defined here as a quotient of the metering mass flow of ammonia precursor solution which reaches the catalyst end face within one hour and of the catalyst end face wetted by the spray cone.

A method is particularly preferred in which the end face loading is at least 0.4 g/(h*cm$^2$), in particular at least 1.0 g/(h*cm$^2$), more particularly at least 2.0 g/(h*cm$^2$), more particularly at least 3.0 g/(h*cm$^2$) and most particularly preferably at least 4.0 g/(h*cm$^2$). Simultaneously or independently, the end face loading can be in particular at most 14.0 g/(h*cm$^2$), more particularly at most 12.0 g/(h*cm$^2$), more particularly at most 10.0 g/(h*cm$^2$), more particularly at most 9.0 g/(h*cm$^2$) and most particularly preferably at most 8.0 g/(h*cm$^2$).

It has been found that, if an excessively large mass flow of ammonia precursor solution were to meet the hot end face, then an excessively great local cooling would occur owing to the heating and evaporation of the liquid, as a result of which complete conversion no longer takes place. Measurements have shown that, in the case of an excessively high metering amount at the catalyst end face and thus excessively large end face loading, cooling of the wetted end face by far above 100 K occurs and thus the temperature level for complete decomposition on the catalyst end face is fallen below and spontaneous further reactions forming undesired by-products occur. If the catalyst end face is selected to be too large and the end face loading is thus too low, the ammonia gas generator becomes inefficient, since in this case an excessively large catalyst is being operated.

From further comprehensive tests, it has been found that a corresponding amount of energy with respect to the amount of ammonia precursor solution is also advantageous in addition to a defined amount of ammonia precursor solution per catalyst end face. In this case, it has surprisingly emerged that the total amount of energy for the complete, residue-free conversion of the ammonia precursor solution into ammonia is substantially independent of the ammonia precursor solution used. Only the metered mass flow of the solution of the ammonia precursor substance correlates with a certain energy flow in the form of an enthalpy flow (essentially a heat flow). It has been found that a specified amount of energy has to be available for the endothermic process of complete conversion of the ammonia precursor solution into ammonia. In this case, it has also emerged that the temperature level at which this decomposition takes place does not need to be taken into account. It has been found that the required temperature level essentially depends on the hydrolysis catalysts used, which can reduce the decomposition temperatures required without altering the total amount of energy required here for decomposition.

It has been found in tests that the supplied heat flow can both be taken from a hot gas stream, for example hot exhaust from a combustion engine as transport gas, and can also be introduced into the ammonia gas generator by additional active heating (electrical, heat exchanger, heating tube or other heat transfer media by means of heat conduction or radiation).

Therefore, a further subject matter of the present invention is a method for continuously generating ammonia from a solution of an ammonia precursor substance by means of an ammonia gas generator comprising a catalyst unit, which comprises a catalyst for decomposing and/or hydrolysing ammonia precursor substances into ammonia and a mixing chamber upstream from the catalyst in the flow direction, the catalyst being of a catalyst volume $V_{Kat}$ and the mixing chamber being of a mixing chamber volume $V_{Misch}$, in which method the solution of the ammonia precursor substance and a carrier gas are introduced into the mixing chamber, the carrier gas and optionally an additional energy source in total having a specific enthalpy flow of $H_{TG}/$ $m_{Precursor}$ of 8000-50000 kJ/kg (enthalpy flow with respect to the introduced mass flow of solution).

A method is particularly preferred in which the specific enthalpy flow is at least 10000 kJ/kg, more particularly at least 12000 kJ/kg and most preferably at least 15000 kJ/kg. Simultaneously or independently, it can be provided that the specific enthalpy flow is at most 45000 kJ/kg, more particularly at most 40000 kJ/kg and most preferably at most 35000 kJ/kg.

In this case, the specific enthalpy flow is defined as a quotient of the enthalpy flow which is passed into the ammonia gas generator and the metering mass flow of ammonia precursor solution which is supplied to the catalyst per unit of time. In this case, the energy required is mainly introduced into the generator in the form of heat.

For an excessively large metering mass flow with a given enthalpy flow, the specific enthalpy flow is fallen below according to the invention since insufficient energy is supplied for the endothermic reaction. Insufficient conversion of the ammonia precursor and thus depositions or formation of undesired by-products, which make continuous generator operation impossible, occur. It has likewise been found that an excessively large specific enthalpy flow leads to an unnecessary load on the ammonia gas generator and thus to inefficient operation and to a high load on the components used.

According to a continuation of the invention, a further subject matter of the present invention is thus a method in which the solution of the ammonia precursor substance and a carrier gas is introduced into the mixing chamber, the carrier gas and optionally an additional energy source in total having a specific enthalpy flow of $H_{TG}/m_{Precursor}$ of 8000-50000 kJ/kg (enthalpy flow with respect to the introduced mass flow of solution) and in which method the solution of the ammonia precursor substance is introduced into the mixing chamber such that the end face loading of the catalyst is 0.2 to 15 g/(h*cm$^2$).

Ideally, in other words so as to achieve a conversion of the ammonia precursor substance into ammonia of more than 95%, particular additional conditions according to the invention have to be met during metering. For particularly favourable results, injection of the ammonia precursor substance into the mixing chamber is required in such a way that, for a given catalyst end face, the spray cone diameter upon incidence on the catalyst end face is at most 98%, preferably at most 95% and more particularly at most 93%, of the catalyst diameter. By contrast, the spray cone diameter has to be at least 80%, preferably at least 83% and more particularly at least 85%, of the catalyst end face diameter so as to prevent an excessively high concentration for a given area and thus excessive end face loading with precursor substance. Excessive loading of the catalyst end face leads to insufficient contact with the catalyst and to excessive cooling as a result of the evaporating liquid, and thus likewise to incomplete conversion and to undesired secondary reactions which are connected with depositions. Ideally, there are combinations of the end face load and/or a specific enthalpy flow with further parameters which are specified by the injection device which should be adhered to. In this context, in particular the type of injection device to be used, and also the distance of the opening of the injection device from the given catalyst end face and the ratio of spray cone diameter to catalyst end face, should be mentioned.

In connection with the present invention, an injection device should be understood to be any device which sprays, atomises or otherwise forms into drops a solution, preferably an aqueous solution, of an ammonia precursor substance, the solution of the ammonia precursor substance being in the form of drops which in particular have a droplet diameter $d_{32}$ of less than 25 µm. In connection with the present invention, the droplet diameter $d_{32}$ relates to the Sauter mean diameter according to the German industry standard DIN 66 141.

Thus, in accordance with a preferred embodiment of the present invention, it is provided that the injection device in turn comprises a nozzle or a plurality of nozzles which generate droplets having a droplet diameter $d_{32}$ of less than 25 µm. In this context, according to the present invention, it is preferably further provided that the nozzle generates droplets having a droplet diameter $d_{32}$ of less than 20 µm and most preferably less than 15 µm. Simultaneously or independently, it is further preferred for the nozzle to generate droplets having a droplet diameter $d_{32}$ of more than 0.1 µm and in particular more than 1 µm. When nozzles of this type are used, an ammonia formation level AG of >95% (see above) can also be achieved. In addition, a particularly uniform distribution of the solution on the catalyst end face can be achieved. In this context and in the following, the ammonia formation level AG is defined as the molar amount of $NH_3$ generated in the method with respect to the molar amount of ammonia which should theoretically be generated by complete hydrolysis of the ammonia precursor substance. According to the present invention, an ammonia formation level of >95% is considered to be complete conversion.

In accordance with a particularly preferred variant, it may in particular be provided that the injection device in turn comprises a nozzle which according to the present invention is what is known as a two-substance nozzle. In this context, a two-substance nozzle is understood to be a nozzle which uses a pressurised gas, generally air, as a propellant for breaking up the surface of the liquid phase and thus for droplet formation. This pressurised gas is also referred to as atomisation air. This form of the nozzle makes particularly fine distribution of the ammonia precursor substance possible, along with a droplet diameter $d_{32}$ of less than 25 µm, in particular less than 20 µm.

In this context, the propellant, in particular the atomisation air, is preferably introduced into the mixing chamber together with the solution of the ammonia precursor substance, through the same nozzle opening.

Independently or simultaneously, the injection device may also comprise at least two nozzles, which can in particular be switched jointly or separately, for introducing the ammonia precursor substance into the mixing chamber.

Alternatively, however, it may also be provided that the injection device comprises what is known as a flash evaporator.

The spray cone according to the present invention is the cone of the solution to be sprayed which can be generated using a nozzle or a plurality of nozzles having a defined spray angle α, the spray cone diameter being the diameter which is obtained when the droplets are incident on the catalyst end face. This is set by the liquid pressure of 0.1 to 10 bar on the solution to be sprayed at 25° C. and optionally by the atomisation air in the operating range of 0.5 to 10 bar (for two-substance nozzles). When using a carrier gas, which is optional according to the invention, the spray cone diameter is set by the liquid pressure of 0.1 to 10 bar on the solution to be sprayed at 25° C. and optionally by the atomisation air in the operating range of 0.5 to 10 bar (for two-substance nozzles) when using carrier gas.

In order to achieve a spray cone diameter of at most 98% of the catalyst diameter, in accordance with a development of the present invention, it can also be provided that the injection device itself comprises a nozzle, in particular a two-substance nozzle, which has a theoretical spray angle α of 10° to 90°. In particular, independently or simultaneously, it can be provided that the distance of the nozzle opening from the catalyst end face is from 15 to 2000 mm.

A nozzle, in particular a two-substance nozzle, is particularly preferred which has a theoretical spray angle α of at least 10°, in particular at least 20°, in particular at least 25°, particularly preferably of at least 30°, particularly preferably of at least 35°, particularly preferably of at least 40° and most preferably of at least 45°. Simultaneously or independently, nozzles are further preferred which have a theoretical spray angle α of at most 90°, in particular of at most 80°, in particular of at most 75°, in particular of at most 70°, particularly preferably of at most 60°, particularly preferably of at most 55° and most preferably of at most 50°. As stated previously, by way of targeted use of a nozzle having a defined spray angle α, a uniform distribution of the solution to be sprayed can be achieved, without depositions occurring on the walls of the catalyst end face.

According to the present invention, the theoretical spray angle α (also referred to as the spray angle α in the following) should be understood to be a spray angle which is set at the outlet of the nozzle opening or nozzle openings with an operating pressure of 0.1 to 10 bar on the solution to be sprayed at 25° C. and optionally with the atomisation air in the operating range from 0.5 to 10 bar (for two-substance nozzles), without a carrier gas or any other influence on the sprayed solution being present.

As a further measure, in order that the inner wall of the catalyst unit not be wetted with the solution of the ammonia precursor substance, it may be provided in accordance with a development of the invention that the ammonia gas generator comprises a further inlet for a carrier gas which generates a tangential carrier gas stream with respect to the solution injected into the mixing chamber. Alternatively, it may also be provided that at least one inlet for carrier gas is provided around the nozzle and is formed in such a way that the carrier gas forms a casing around the solution introduced into the mixing chamber. In this way, the sprayed solution is enclosed in a casing of carrier gas, in such a way that no wetting of the inner wall is observed.

In a further embodiment, the invention therefore relates to an ammonia gas generator which comprises at least one inlet for a carrier gas. The inlet is preferably located in the mixing chamber and is in particular separate or separated from the nozzle opening through which the solution of the ammonia precursor substance is introduced. The carrier gas may thus be introduced independently of the ammonia precursor substance solution. The inlet preferably generates a tangential or parallel carrier gas stream with respect to the solution injected into the mixing chamber. For a parallel carrier stream, one or more inlet openings for carrier gas are preferably arranged in the same wall in which the injection device for introducing the solution of the ammonia precursor substance is located.

Surprisingly, it has been found that, as a result of a tangential or parallel carrier gas stream, depositions on the walls of the catalyst unit in the region of the mixing chamber can be further inhibited, and it can be provided that the carrier gas and the solution of the ammonia precursor substance are constantly thoroughly mixed. Thus, wetting of the wall of the catalyst unit in the region of the mixing chamber can be almost completely inhibited. As a result of the tangential carrier gas stream, an eddy mist current comprising the droplets is generated, and is guided axially in the direction of the hydrolysis catalyst onto the hydrolysis catalyst end face. This eddy mist current makes very good conversion into ammonia possible on the catalyst. The tangential supply of the carrier gas is provided in the head region of the generator, at the level of the spraying device of the ammonia precursor solution into the catalyst unit or into the mixing chamber. In this context, the gas stream is introduced as shallowly as possible against the wall of the mixing chamber, in such a way that a downwardly directed eddy current in the catalyst unit in the direction of the catalyst end face sets in.

A similar effect is produced if a nozzle is used which comprises a first number of nozzle openings for introducing the solution of the ammonia precursor substance into the catalyst unit, which are annularly surrounded by a second number of nozzle openings for introducing a carrier gas or atomisation air into the catalyst unit.

In connection with the present invention, it is further provided that the distance of the nozzle opening from the end face of the catalyst may comprise of in particular 15 to 1500 mm and particularly preferably 15 to 1000 mm and most preferably 15 to 800 mm. Independently or simultaneously, however, it may also be provided that the distance of the nozzle opening from the end face of the catalyst is at least 30 mm, particularly preferably at least 50 mm, particularly preferably at least 60 mm, particularly preferably at least 100 mm and most preferably at least 300 mm, and further independently or simultaneously at most 1500 mm, in particular at most 1000 mm, in particular at most 800 mm, in particular at most 500 mm, in particular at most 400 mm, particularly preferably at most 200 mm and most preferably at most 150 mm.

In accordance with a development of the present invention, it is also provided that the ratio of the volume of the mixing chamber $V_{Misch}$ to the volume of the catalyst $V_{Kat}$ is a ratio of 1.5:1 to 5:1. Surprisingly, it has been found that the sprayed ammonia precursor substance can be broken down in particular completely (conversion >95%) into ammonia if the droplets of the solution are evaporated in part in advance prior to incidence on the catalyst end face. This may be ensured in that the volume of the mixing chamber is greater than the volume of the catalyst. By way of partial evaporation of the droplets, the solution is already supplied with enough energy to prevent excessive cooling on the catalyst end face as a result of excessively large drops, and thus poor decomposition or by-product formation is countered. In addition, a corresponding mixing chamber volume $V_{Misch}$ ensures that the sprayed ammonia precursor substance is incident on the catalyst, distributed over the cross-section of the catalyst homogeneously in the transport gas stream, as an aerosol, and spots having an excessive concentration, which would in turn lead to poorer conversion, are prevented. In this context, it is most preferably provided that the ratio of the volume of the mixing chamber $V_{Misch}$ to the volume of the catalyst $V_{Kat}$ is from 2.5:1 to 5:1, particularly preferably 3:1 to 5:1 and most preferably 3.5:1 to 5:1.

The volume of the catalyst $V_{Kat}$ is preferably 50 ml to 1000 l. The volume of the mixing chamber $V_{Misch}$ is preferably at least 10 ml, preferably at least 50 ml, more preferably at least 100 ml, more preferably at least 200 ml, more preferably at least 1000 ml, more preferably at least 2000 ml and more preferably at least 5000 ml. Simultaneously or independently, the volume of the mixing chamber $V_{Misch}$ is preferably at most 2.5 l, more preferably at most 10 l, more preferably at most 80 l, more preferably at most 500 l, more preferably at most 1200 l and more preferably at most 2000 l.

Further, in accordance with the present invention a catalyst unit should be understood to be a unit which comprises a housing for receiving a catalyst, a mixing chamber which is upstream from the catalyst in the flow direction, and at least one catalyst for decomposing and/or hydrolysing ammonia precursor substances into ammonia, the catalyst having a catalyst volume $V_{Kat}$ and the mixing chamber having a mixing chamber volume $V_{Misch}$. Optionally, the catalyst unit may additionally comprise an outlet chamber which is downstream from the catalyst in the flow direction for outputting the ammonia gas formed.

In the context of the present invention, any catalyst which makes it possible to release ammonia from the ammonia precursor substance under catalytic conditions may be used as the catalyst for decomposing and/or hydrolysing ammonia precursor substances. A preferred catalyst hydrolyses the ammonia precursor substance to form ammonia and further harmless substances such as nitrogen, carbon dioxide and water. This is therefore preferably a hydrolysis catalyst. If for example a guanidinium salt solution is used, in particular a guanidinium formate solution or a urea solution or mixtures thereof, the catalytic decomposition into ammonia may take place in the presence of catalytically active, non-oxidation-active coatings of oxides, selected from the group of titanium dioxide, aluminium oxide and silicon dioxide and mixtures thereof, and/or hydrothermically stable zeolites, which are fully or partially metal-exchanged, in particular iron zeolites of the ZSM 5 or BEA type. In this context, in particular the subgroup elements and preferably iron or copper are possibilities for the metals.

The metal oxides, such as titanium oxide, aluminium oxide and silicon dioxide, are preferably applied to metal carrier materials such as heating line alloys (in particular chromium aluminium steels).

Particularly preferred catalysts are hydrolysis catalysts which in particular comprise catalytically active coatings of titanium dioxide, aluminium oxide and silicon dioxide and mixtures thereof.

Alternatively, catalytic decomposition of ammonia precursor substance solutions, in particular the guanidinium formate solutions or the remaining components to form ammonia and carbon dioxide, may also be provided, it being possible for catalytically active coatings of oxides, selected from the group of titanium dioxide, aluminium oxide and silicon oxide and mixtures thereof, and/or hydrothermally stable zeolites, which are fully or partly metal-exchanged, to be used, which zeolites are impregnated with gold and/or palladium as oxidation-active components. The corresponding catalysts comprising palladium and/or gold as active components preferably have a precious metal content of 0.001 to 2% by weight, in particular 0.01 to 1% by weight. Using oxidation catalysts of this type, it is possible to prevent the undesired formation of carbon monoxide as a by-product during the decomposition of the guanidinium salt during the generation of ammonia.

Preferably, a catalytic coating comprising palladium and/or gold as active components, having a precious metal content of 0.001 to 2% by weight, in particular 0.01 to 1% by weight, is used for the catalytic decomposition of the guanidinium formate and optionally the further components.

Thus, a further subject matter of the present invention is a method in which a catalyst, which is in particular a hydrolysis catalyst, comprising a catalytically active coating is used, which is impregnated with gold and/or palladium, in particular having a gold and/or palladium content of 0.001 to 2% by weight (with respect to the catalytic coating). More preferably, this catalyst comprises a catalytically active coating of oxides selected from the group of titanium dioxide, aluminium oxide and silicon dioxide and mixtures thereof, and/or hydrothermally stable zeolites, which is impregnated with gold and/or palladium, the content of gold and/or palladium more preferably being 0.001 to 2% by weight (with respect to the catalytic coating).

In the context of the present invention, it is possible to use a hydrolysis catalyst which consists of at least two portions in the flow direction, the first portion containing non-oxidation-active coatings and the second portion containing oxidation-active coatings. Preferably, 5 to 90% by volume of this catalyst consists of non-oxidation-active coatings and 10 to 95% by volume consists of oxidation-active coatings. In particular, 15 to 80% by volume of this catalyst consists of non-oxidation-active coatings and 20 to 85% by volume consists of oxidation-active coatings. Alternatively, the hydrolysis may also be carried out in the presence of two catalysts arranged in series, the first catalyst containing non-oxidation-active coatings and the second catalyst containing oxidation-active coatings. More preferably, the first hydrolysis catalyst may also be a heated catalyst and the second hydrolysis catalyst may be an unheated catalyst.

Moreover, it may be provided to use a hydrolysis catalyst which consists of at least two portions, the first portion of the hydrolysis catalyst, arranged in the flow direction, being in the form of a heated catalyst and the second portion thereof, arranged in the flow direction, being in the form of an unheated catalyst. Preferably, 5 to 50% by volume of the catalyst consists of the first portion and 50 to 95% by volume consists of the second portion.

According to a particularly preferred configuration of the present invention, it is provided that the ammonia gas generator comprises a catalyst unit comprising a hydrolysis catalyst which is at least divided in two, particularly preferably at least divided into three, the first part of which in the flow direction is in the form of a heated catalyst, which preferably comprises a direct electrical resistance heater and/or a jacket heater, and the second part of which is in the form of an unheated catalyst, which is most preferably followed downstream by an unheated catalyst having a mixer structure as the third part.

An ammonia gas generator is particularly preferred which comprises a catalyst unit of which the catalyst has a ratio of the diameter $D_{KAT}$ of the catalyst to the length L of the catalyst of 1:1 to 1:5, in particular of 1:2 to 1:4 and most preferably of 1:3. The catalyst diameter $D_{KAT}$ is preferably 20 to 2000 mm, in particular 30 to 1000 mm and even more preferably 30 to 100 mm. However, it may also be provided that the diameter $D_{Kat}$ is 30 to 80 mm, 80 to 450 mm or 450 to 1000 mm.

In this context, it is further preferred for the catalyst to be of a length L of 30 mm to 2000 mm, particularly preferably of 70 mm to 1000 mm and most preferably of 70 mm to 700 mm.

It has been found that, for complete catalytic conversion of the ammonia precursor substance, catalysts having a catalyst cell count of at least 60 cpsi (cpsi: cells per square inch) and having the above-disclosed catalyst volumes are preferably used. In this context, the increasing counter pressure (loss of pressure by way of the catalyst) limits the catalyst cell count to at most 800 cpsi for an application in an ammonia gas generator. Catalysts, in particular hydrolysis catalysts, are particularly preferred which have a catalyst cell count of 100 to 600 cpsi per square inch end face, of 100 to 500 cpsi per square inch end face and most preferably of 100 to 400 cpsi per square inch end face of the catalyst.

As regards the configuration of the catalyst unit, it has been found in tests that a cylindrical construction is particularly suitable. In this case, the optional tangential carrier gas stream can take full effect. By contrast, other constructions are less suitable, since in this case an excessively strong turbulence can be observed. Thus, a further subject matter of the present invention is an ammonia gas generator which comprises a catalyst unit which is in the form of a cylinder.

Furthermore, it has proven to be particularly preferably for the ammonia gas generator to comprise a catalyst unit which comprises a thermal insulation layer, more particularly a thermal insulation layer made of microporous cladding material.

According to the present invention, ammonia precursor substances are understood to be chemical substances which can be placed in solution and which can split off or otherwise release ammonia by physical and/or chemical processes. According to the present invention, in particular urea, urea derivatives, guanidine, biguanidine and salts of these compounds and salts of ammonia may be used as ammonia precursor compounds. According to the present invention, in particular urea and guanidine or salts thereof can be used. In particular the salts which are formed from guanidines and organic or inorganic acids may be used. In this context, guanidinium salts of general formula (I) are considered to be particularly preferred,

(I)

where
R=H, $NH_2$ or $C_1$-$C_{12}$ alkyl,
$X^{\ominus}$=acetate, carbonate, cyanate, formate, hydroxide, methylate or oxalate.

Guanidinium formate is particularly preferred.

In the context of the present invention, these guanidinium salts may be used in the form of an individual substance or a mixture of two or more different guanidinium salts. In accordance with a preferred embodiment, the guanidinium salts which are used according to the invention are combined with urea and/or ammonia and/or ammonium salts. Alternatively, however, in accordance with a further embodiment of the present invention aqueous urea solutions may also be used. The mixing ratios of guanidinium salt with urea and ammonia or ammonium salts can be varied within wide limits. However, it has been found to be particularly advantageous if the mixture of guanidinium salt and urea has a guanidinium salt content of 5 to 60% by weight and a urea content of 5 to 40% by weight, in particular of 5 to 35% by weight. Further, mixtures of guanidinium salts and ammonia or ammonium salts having a guanidinium salt content of 5 to 60% by weight and an ammonia or ammonium salt content of 5 to 40% by weight should be considered to be preferred. Alternatively, however, a urea solution, in particular an aqueous urea solution, may be used.

Compounds of general formula (II) have been found to be particularly expedient as ammonium salts

(II)

where
R=H, $NH_2$ or C1-C12 alkyl,
$X^{\ominus}$=acetate, carbonate, cyanate, formate, hydroxide, methylate or oxalate.

The ammonia precursor substances which are used according to the invention, in particular guanidinium salts, and optionally the further components, consisting of urea or ammonium salts, are used in the form of a solution, predominantly water and/or a $C_1$-$C_4$ alcohol preferably being used as the solvent. In this context, the aqueous and/or alcoholic solutions have a preferred solids content of 5 to 85% by weight, in particular 30 to 80% by weight.

In this context, it has surprisingly been found that according to the present invention both aqueous guanidinium formate solution in a concentration of 20 to 60% by weight and aqueous urea solution in a concentration of 25 to 40% by weight, as well as aqueous mixtures of guanidinium formate and urea solutions, the mixture containing guanidinium formate and urea at a concentration of 5 to 60% by weight guanidinium formate and 5 to 40% by weight urea, may particularly expediently be used.

In this context, the aqueous solution of the ammonia precursor substances, in particular the guanidinium salts, the mixtures of guanidinium salts or the guanidinium salts in combination with urea in water have a preferred ammonia formation potential of 0.2 to 0.5 kg ammonia per liter of solution, in particular 0.25 to 0.35 kg ammonia per liter of solution.

Surprisingly, it has also been found that, as a result of a tangential carrier gas stream (a synonym is transport gas stream), depositions on the walls of the catalyst unit in the region of the mixing chamber can be further inhibited, and it can be provided that the carrier gas (a synonym is transport gas) and the solution of the ammonia precursor substance are constantly thoroughly mixed. If a tangential carrier gas stream of this type is not used, then, by spraying the solutions into the mixing chamber, the walls of the catalyst unit are wetted in the region of the mixing chamber and undesired secondary reactions, such as polymerisation of the ammonia precursor substance, take place. These secondary reactions lead to undesired depositions in the region of the mixing chamber, whereby thorough mixing of the carrier gas and the solution, which is extremely important for the functioning of the generator, is permanently no longer possible. Owing to the lack of thorough mixing of the carrier gas with the solution, additional depositions are also observed in and on the catalyst itself. As a result of the tangential carrier gas stream, an eddy mist current comprising the droplets is generated, and is guided axially in the direction of the hydrolysis catalyst onto the hydrolysis catalyst end face. This eddy mist current makes very good conversion into ammonia possible on the catalyst.

The tangential supply of the carrier gas is provided in the head region of the generator, at the level of the spraying device of the ammonia precursor solution into the catalyst unit or into the mixing chamber. In this context, the gas stream is introduced as shallowly as possible against the wall of the mixing chamber, in such a way that a downwardly directed eddy current in the catalyst unit in the direction of the catalyst end face sets in.

According to a further aspect, a further subject matter of the present invention is thus a method for continuously generating ammonia from a solution of an ammonia precursor substance by means of an ammonia gas generator, in particular by means of an ammonia gas generator described herein which comprises a catalyst unit, which in turn comprises a catalyst for decomposing and/or hydrolysing ammonia precursor substances into ammonia and a mixing chamber upstream from the catalyst in the flow direction, the catalyst being of a catalyst volume $V_{Kat}$ and the mixing chamber being of a mixing chamber volume $V_{Misch}$, in which method the solution of the ammonia precursor substance is introduced into the mixing chamber separately from a carrier gas, and the carrier gas is furthermore preferably introduced tangentially to the solution of the ammonia precursor substance. In particular, the solution of an ammonia precursor substance is injected into the mixing chamber by means of a nozzle.

A method is particularly preferred in which i) the solution of the ammonia precursor substance is introduced into the mixing chamber in such a way that the end face loading of the catalyst is 0.2 to 15 g/(h*cm²) and/or ii) the solution of the ammonia precursor substance and a carrier gas are introduced into the mixing chamber, the carrier gas and optionally an additional energy source in total have a specific enthalpy flow of $H_{TG}/m_{Precursor}$ of 8000-50000 kJ/kg (enthalpy flow with respect to the mass flow of solution introduced) and/or iii) the solution of the ammonia precursor substance is introduced into the mixing chamber separately from a carrier gas and the carrier gas is furthermore preferably introduced tangentially to the solution of the ammonia precursor substance.

Owing to the introduction of the solution of the ammonia precursor substance separately from the carrier gas, targeted metering of the required amount of energy or of the heat flow can be implemented for the fault-free, continuous operation of the generator. It has been found that, by means of a sufficient amount of energy at an appropriate temperature level, the method can be implemented without undesired by-products forming. Complete decomposition of the usable ammonia precursor solutions into ammonia requires, at a given amount or mass flow of solution, a corresponding amount or mass flow of energy in the form of heat at a temperature level necessary for complete decomposition. In this case, the temperature level is determined by the hydrolysis catalyst used. The energy which is predominantly introduced into the process preferably comes from the carrier gas stream.

According to the invention, an ammonia gas generator will in particular operate technically and efficiently when the energy introduced for decomposing the ammonia precursor solution, which energy comes from the lost heat of the carrier gas, is used. In this case, the amount of carrier gas does not automatically correlate with the metering amount of the liquid solution, since the usable amount of energy from the carrier gas varies according to the temperature. A carrier gas stream at a somewhat lower temperature level, thus a somewhat lower temperature difference between input and output in the ammonia gas generator, can for example be equalised by a higher carrier gas mass flow and thus a higher heat flow input into the generator.

The carrier gas, and in particular the tangential carrier gas stream, is preferably introduced into the mixing chamber at a temperature of up to 550° C., preferably at a temperature of 250 to 550° C., more preferably at a temperature of 250 to 400° C. and most preferably at a temperature of 300 to 350° C.

It has been found here that for example a partial stream of an exhaust can also be used as a carrier gas, or a carrier gas differing therefrom, such as a partial stream of engine charge air preconditioned to an appropriate temperature level by a heat exchanger, can also be used. If a partial stream of an exhaust is used, it has been found to be particularly advantageous if the partial stream contains less than 5% of the total exhaust. In accordance with a development, it may however also be provided that a partial stream which contains at least 0.1% of the total exhaust and more preferably less than 4% and most preferably less than 2% of the total exhaust is used as a transport gas.

In principle, according to the invention any gas may be used as a carrier gas stream. Since the carrier gas stream should preferably be at a temperature of 250° C. to 550° C., for good energy efficiency a gas which has already been heated is preferably used, such as charge air or part of the exhaust stream. However, it is also possible to heat any desired carrier gas to the desired temperature.

According to a further preferred configuration, it can also in particular be provided that the solution is sprayed into the mixing chamber from the reservoir container by means of a pump and a nozzle at a theoretical spray angle α of 10 to 40°.

According to a further advantageous configuration of the method, it has been found that particularly high efficiency of the method can be provided when the solution of the ammonia precursor substance is injected at a pressure of at least 0.5 bar and the atomisation air is injected at a pressure of 0.5 to 2 bar.

It has been found to be particularly advantageous if the solution of the ammonia precursor substance is particularly finely distributed over the catalyst end face. Therefore, a further subject matter of the invention is a method for generating ammonia in which the solution of the ammonia precursor substance is applied to the end face of the catalyst in the form of droplets having a droplet diameter $D_{32}$ of less than 25 µm. In this context, according to the present invention, it is preferably further provided that the nozzle generates droplets having a droplet diameter $d_{32}$ of less than 20 µm and most preferably less than 15 µm. Simultaneously or independently, it is further preferred for the nozzle to generate droplets having a droplet diameter $d_{32}$ of more than 0.1 µm and in particular more than 1 µm. When nozzles of this type are used, an ammonia formation level of >95% (see above) can also be achieved. In addition, a particularly uniform distribution of the solution on the catalyst end face can be achieved.

It has further been found that is preferable for the solution of the ammonia precursor substance to be sprayed into the mixing chamber perpendicular to the catalyst end face. Independently or simultaneously, in this case the volume ratio of carrier gas to atomisation air can be 7:1 to 10:1.

Further parameters which are preferably adhered to during the operation of the ammonia gas generator according to the invention are as follows.

The metering mass flow of the solution of the ammonia precursor substance per hour is preferably from 50 g/h to 280 g/h, in particular from 100 g/h to 200 g/h.

The mass flow of carrier gas is preferably 1 to 10 kg/h, in particular 3 to 7 kg/h.

The mass flow of atomisation air is preferably 0.14 to 1.43 kg/h, in particular 0.5 to 1 kg/h.

The additional amount of heating energy is preferably from 0 to 150 W, in particular 50 to 100 W.

The catalyst end face temperature is preferably set to 280 to 500° C., in particular to 300 to 400° C.

The catalyst outlet temperature is preferably set to 250 to 450° C., in particular to 280 to 380° C.

The catalyst space velocity is preferably 5000 to 30000 1/h, in particular 10000 to 20000 1/h.

The metering pressure of the liquid of the ammonia precursor substance is preferably 1 to 8 bar, in particular 1.5 to 3 bar.

Because of the compact construction thereof, the ammonia gas generators disclosed herein are particularly suitable for use in industrial facilities, in combustion engines such as diesel engines and petrol engines, and gas engines. Therefore, the use of the described method for reducing nitrogen oxides in exhaust from industrial facilities, from combustion engines such as diesel engines and petrol engines, and from gas engines is also within the scope of the present invention.

The invention further comprises, in isolation, in combination with the previously disclosed features and in any combination, the following embodiments:

A method for continuously generating ammonia from a solution of an ammonia precursor substance by means of an ammonia gas generator (100) comprising a catalyst unit (70), which comprises a catalyst (60) for decomposing and/or hydrolysing ammonia precursor substances into ammonia and a mixing chamber (51) upstream from the catalyst (60) in the flow direction, the catalyst (60) being of a catalyst volume $V_{Kat}$ and the mixing chamber (51) being of a mixing chamber volume $V_{Misch}$, characterised in that the solution of the ammonia precursor substance is introduced into the mixing chamber together with a carrier gas, the carrier gas and optionally an additional energy source in total having a specific enthalpy flow $H_{TG}/m_{Precursor}$ of 8000-50000 kJ/kg (enthalpy flow with respect to the mass flow of solution introduced).

A method for continuously generating ammonia from a solution of an ammonia precursor substance by means of an ammonia gas generator (100) comprising a catalyst unit (70), which comprises a catalyst (60) for decomposing and/or hydrolysing ammonia precursor substances into ammonia and a mixing chamber (51) upstream from the catalyst (60) in the flow direction, the catalyst (60) being of a catalyst volume $V_{Kat}$ and the mixing chamber (51) being of a mixing chamber volume $V_{Misch}$, characterised in that the solution of the ammonia precursor substance is applied to the end face (61) of the catalyst (60) in the form of droplets having a droplet diameter $D_{32}$ of less than 20 μm.

A method for continuously generating ammonia from a solution of an ammonia precursor substance by means of an ammonia gas generator (100) comprising a catalyst unit (70), which comprises a catalyst (60) for decomposing and/or hydrolysing ammonia precursor substances into ammonia and a mixing chamber (51) upstream from the catalyst (60) in the flow direction, the catalyst (60) being of a catalyst volume $V_{Kat}$ and the mixing chamber (51) being of a mixing chamber volume $V_{Misch}$, characterised in that, separately from the solution of the ammonia precursor substance, a carrier gas is also introduced into the mixing chamber (5), a partial stream of an exhaust that contains 0.1 to 5% of the total exhaust being used as the carrier gas.

A method for continuously generating ammonia from a solution of an ammonia precursor substance by means of an ammonia gas generator (100) comprising a catalyst unit (70), which comprises a catalyst (60) for decomposing and/or hydrolysing ammonia precursor substances into ammonia and a mixing chamber (51) upstream from the catalyst (60) in the flow direction, the catalyst (60) being of a catalyst volume $V_{Kat}$ and the mixing chamber (51) being of a mixing chamber volume $V_{Misch}$, characterised in that, separately from the solution of the ammonia precursor substance, a carrier gas is additionally introduced parallel to the solution of the ammonia precursor substance injected into the mixing chamber.

A method for continuously generating ammonia from a solution of an ammonia precursor substance by means of an ammonia gas generator (100) comprising a catalyst unit (70), which comprises a catalyst (60) for decomposing and/or hydrolysing ammonia precursor substances into ammonia and a mixing chamber (51) upstream from the catalyst (60) in the flow direction, the catalyst (60) being of a catalyst volume $V_{Kat}$ and the mixing chamber (51) being of a mixing chamber volume $V_{Misch}$, characterised in that the solution of the ammonia precursor substance is introduced into the mixing chamber in such a way that the spray cone diameter upon incidence on the catalyst end face is at least 80% and at most 98% of the catalyst diameter.

A method for continuously generating ammonia from a solution of an ammonia precursor substance by means of an ammonia gas generator (100) comprising a catalyst unit (70), which comprises a catalyst (60) for decomposing and/or hydrolysing ammonia precursor substances into ammonia and a mixing chamber (51) upstream from the catalyst (60) in the flow direction, the catalyst (60) being of a catalyst volume $V_{Kat}$ and the mixing chamber (51) being of a mixing chamber volume $V_{Misch}$, characterised in that a catalyst (60), in particular a hydrolysis catalyst, is used which has a catalytic coating impregnated with gold and/or palladium.

In the following, the present invention is described in greater detail by way of drawings and associated examples, in which.

Figure 1:
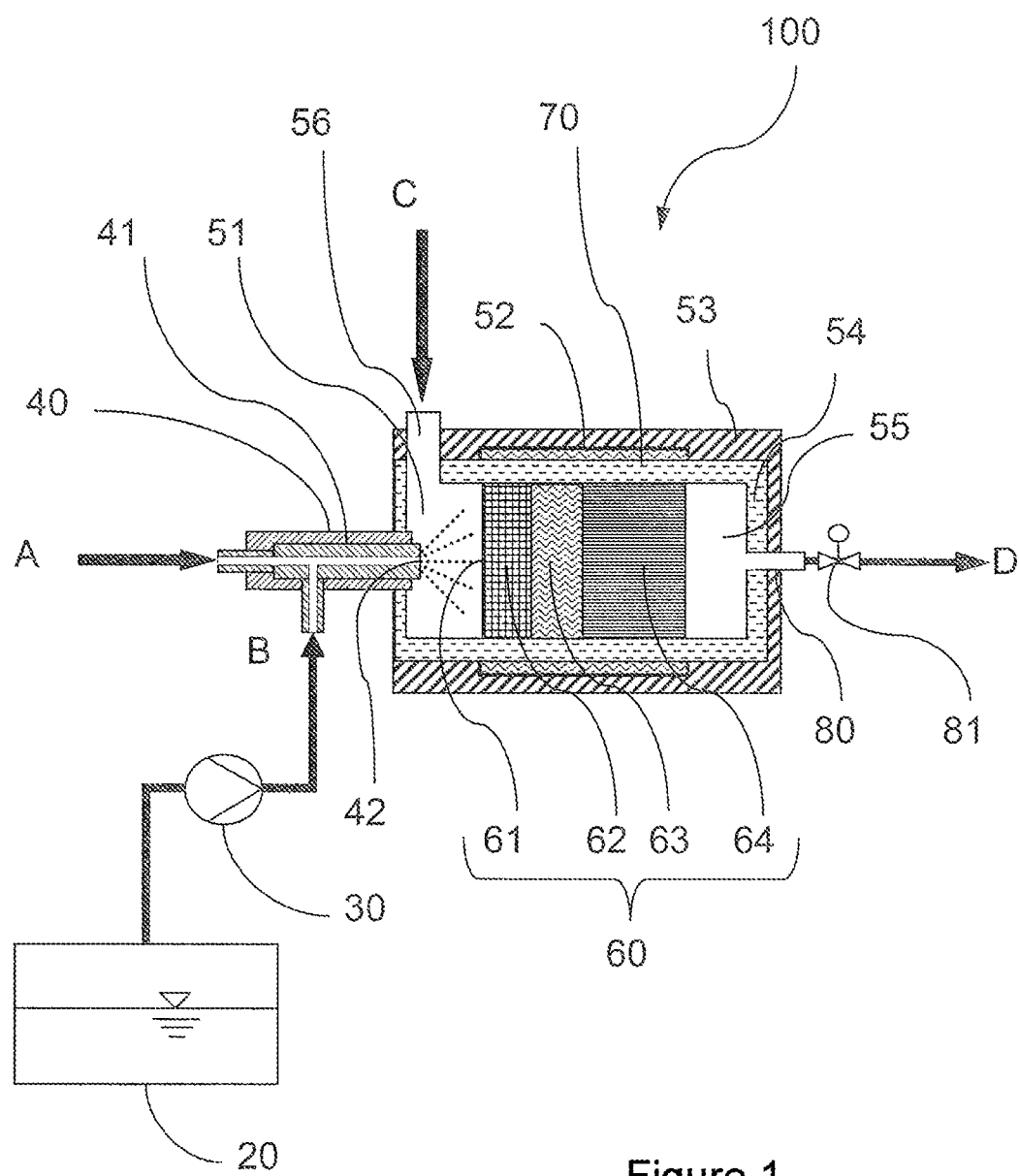
FIG. 1 is a schematic axial cross-sectional view of a first ammonia gas generator.

FIG. 1 shows a first ammonia gas generator (100) according to the present invention. The generator (100) is in the form of a cylinder and comprises an injection device (40), a catalyst unit (70) and an outlet (80) for the ammonia gas formed. The catalyst unit (70) consists of a multi-part hydrolysis catalyst (60), a mixing chamber (51) and an outlet chamber (55). In the operating state, the ammonia precursor solution (B) is sprayed out of a reservoir container (20) via a metering pump (30) together with an atomisation air stream (A) via a two-substance nozzle (41) having a nozzle opening (42) into the mixing chamber (51) of the ammonia gas generator (100) at a defined spray angle, and distributed into fine droplets. Additionally, a hot transport gas stream (C) is introduced into the mixing chamber (51) tangentially via the inlet (56), causing an eddy mist flow comprising the droplets to be generated, which is passed axially in the direction of the hydrolysis catalyst (60) onto the hydrolysis catalyst end face (61). The catalyst (60) is configured in such a way that the first segment (62) is in the form of an electrically heatable metal carrier comprising a hydrolysis coating. This is followed by an unheated metal carrier catalyst (63), likewise comprising a hydrolysis coating and an unheated catalyst (64) comprising a hydrolysis coating configured as a mixer structure for better radial distribution. The generated ammonia gas (D) exits the generator (100) together with the hot carrier gas stream via the outlet chamber (55) comprising the outlet (80) and the valve (81). The generator may additionally be heated by a jacket heater (52) around the housing (54) of the catalyst unit. Apart from the head region in which the injection device (40) is located, the ammonia gas generator (100) is enclosed in a thermal insulation (53) of microporous cladding material.

Figure 2:
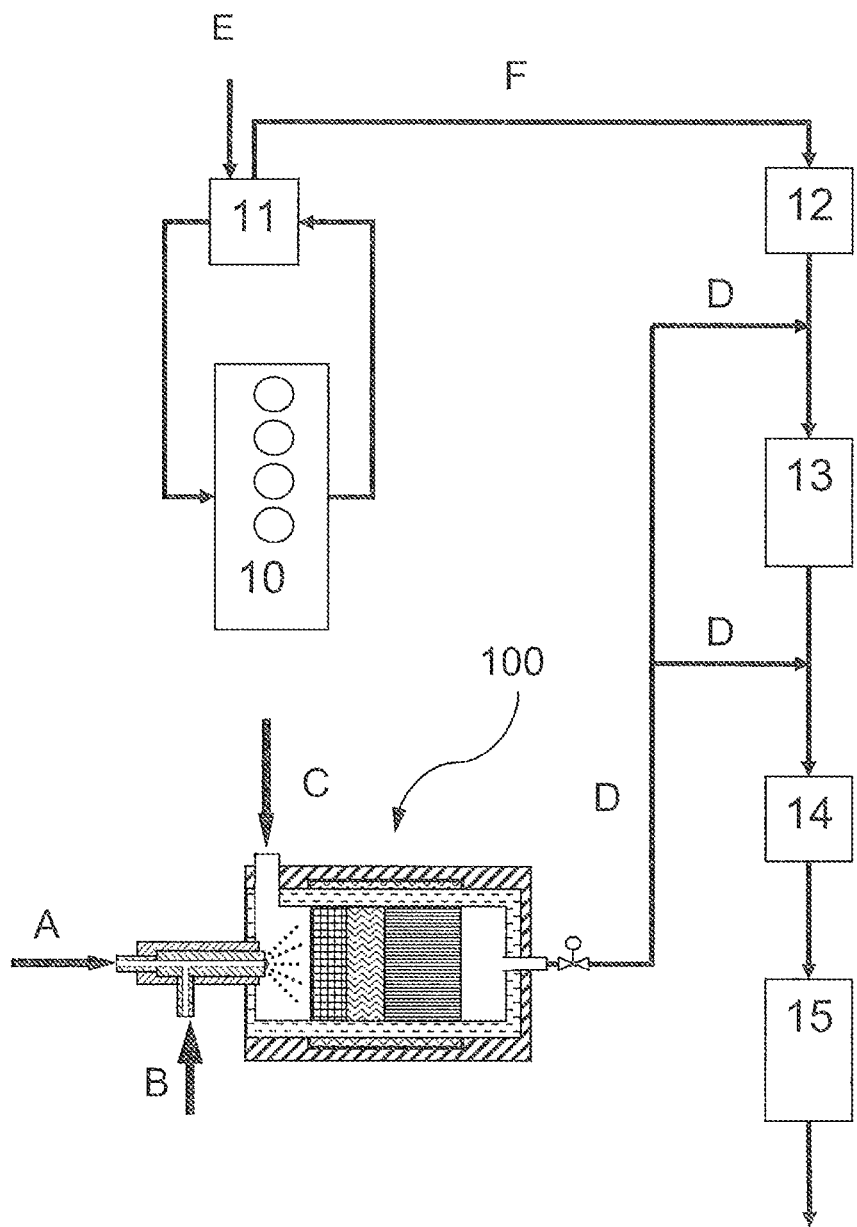
FIG. 2 shows a schematic construction of an exhaust system in a vehicle.

FIG. 2 shows a schematic material flow of an exhaust treatment on a combustion engine (10). In this context, the exhaust from the combustion engine (10) is passed through a charging unit (11) and in a counter flow incoming air (E) for the internal combustion engine is compressed. The exhaust (F) is guided over an oxidation catalyst (12), so as to achieve a higher $NO_2$ concentration in relation to NO. The ammonia-containing gas stream (D) from the ammonia gas generator (100) can be supplied and mixed in both upstream and downstream from a particle filter (13). In this context, an additional gas mixer (14) in the form of a static mixer or for example a Venturi mixer may be used. The NOx is reduced at the SCR catalyst (15) by means of the reducing agent $NH_3$ at an SCR catalyst (SCR=selective catalytic reduction). In this context, the ammonia gas generator may be operated using separate carrier gas or else using a partial exhaust stream.

Figure 3:
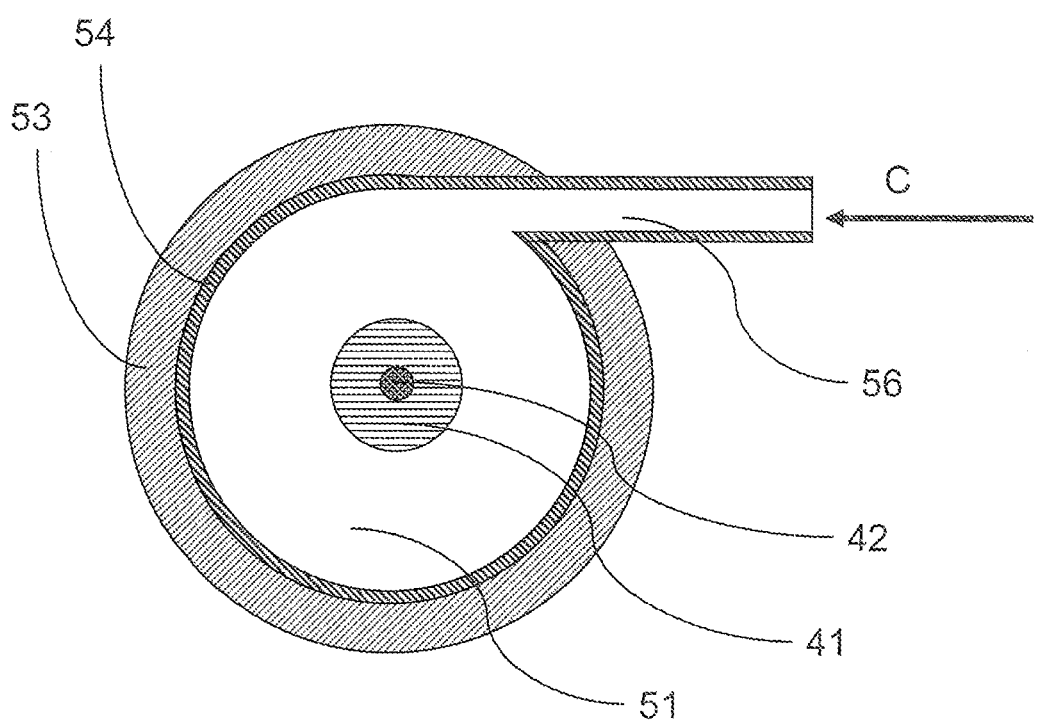
FIG. 3 is a radial cross-section of the mixing chamber (plan view) in the region of the tangential carrier gas stream supply.

FIG. 3 is a detailed view of the mixing chamber (51) in the region of the tangential carrier gas stream supply. The housing (54) of the catalyst unit is enclosed in a thermal insulation (53) of microporous cladding material in the region of the mixing chamber (51). The tangential supply of the carrier gas (C) is provided in the head region of the ammonia gas generator or in the head region of the mixing chamber (51), at the level of the nozzle opening (42) of the nozzle (41). In this context, the inlet (56) for the carrier gas stream (C) is configured in such a way that the gas stream is introduced as shallowly as possible against the wall (54) of the mixing chamber, in such a way that a downwardly directed eddy current in the generator in the direction of the catalyst and thus a tangential carrier gas stream inside the catalyst unit sets in.

PRACTICAL EXAMPLE 1

The construction basically corresponds to the ammonia gas generator shown in FIG. 1. The ammonia gas generator is configured for a metering amount of 10-100 g/h $NH_3$ and is in the form of a cylindrical tubular reactor. A two-substance nozzle from Schlick, model 970 (0.3 mm), having a variable air cap and coated with amorphous Si, is arranged centrally in the head region. The ammonia precursor substance is metered in at room temperature through this nozzle and atomised in a full cone. The spray angle α is 30°. In this context, the liquid is entrained, by means of a pressurised air stream (0.5-2 bar) of approximately 0.8 kg/h which is passed through the nozzle, and atomised. The Sauter mean diameter of the resulting droplets below the nozzle is <25 μm. There is a uniform radial distribution of the solution of the ammonia precursor substance over the reactor cross-section in the hot transport gas stream upstream from the hydrolysis catalyst in a mixing chamber, without these touching the reactor wall in the process, which could lead to depositions. In the mixing chamber drops are already evaporating in such a way that upon incidence on the catalyst end face the drop diameter is reduced by up to 20%. As a result of the droplets which are still present, cooling of approximately 120-150° C. occurs at the catalyst end face. Therefore, the reactor is configured in such a way that the amount of heat supplied with the hot transport gas stream, the integrated heatable hydrolysis catalyst and further supplies of energy introduce sufficient energy that for the amount of solution metered in there is no cooling to below approximately 300° C. In this context, the metering amount of 50-280 g/h is controlled by means of a Bosch PWM valve. The pressure for conveying the liquid is generated from a pressurised air line in a reservoir container by overpressure, and therefore no additional conveyor pump is required.

A hot transport gas stream of approximately 1-5 kg/h is likewise introduced tangentially in the head region of the ammonia gas generator in such a way that it is laid in a mist stream around the reactor wall and is passed through the mixing chamber in a spiral shape. By means of this gas stream, on one hand axial transport through the reactor is achieved at a defined retention time (reciprocal value of the space velocity) and on the other hand, sprayed droplets are prevented from coming into contact with the reactor wall. The diameter of the mixing chamber in the head region of the reactor is 70 mm. The length of the mixing chamber is 110 mm. The mixing chamber is additionally heated from the outside via an electric resistance heating casing (heating time max. 1 min.)—model Hewit 0.8-1 kW, 150-200 mm. The temperature is regulated in connection with temperature sensors (type K) which are arranged in and downstream from the catalyst and on the catalyst end face. All of the outer surfaces of the reactor are enclosed by Microtherm superG insulation. In this context, the Microtherm superG filling is embedded between glass fibre meshing which is wound around the reactor. Only the head region in which the solution is injected is uninsulated, for better heat dissipation. The surfaces in the mixing chamber are coated with catalytically active $TiO_2$ washcoats (anatase structure).

A heatable metal carrier catalyst of 55 mm diameter and 400 cpsi (Emitec Emicat, maximum power 1.5 kW, volume approximately 170 ml) is flange-mounted downstream from the mixing chamber. Said catalyst is in the form of a hydrolysis catalyst, likewise coated with catalytically active $TiO_2$ (anatase, washcoat approximately 100 g/l, from Interkat/Südchemie), and is regulated in such a way that the temperature at the catalyst end face is between 300 and 400° C. In this context, only enough energy is supplied to compensate the cooling resulting from the evaporation of the droplets. To achieve a space velocity of up to at least 7000 1/h, a further hydrolysis catalyst of 400 cpsi is connected downstream, resulting in a total catalyst volume of approximately 330 ml.

The ammonia generated at the hot hydrolysis catalyst flows freely in the foot region via the outlet chamber, centrally from an outlet opening from the reactor end piece. In this context, the outlet region is preferably shaped conically, so as to prevent eddy formation at edges and thus depositions of possible residues. The gas mixture from the ammonia gas generator is preferably supplied to the motor exhaust stream upstream from the SCR catalyst at a temperature >80° C. to prevent ammonium carbonate depositions, and distributed homogeneously in this exhaust stream by way of a static mixer.

1.4301 (V2A, Din X 5 CrNi 18-10) or alternatively 1.4401 (V4A, DIN X 2 CrNiMo 17-12-2), 1.4767, or other Fe Cr Al alloys typical of exhaust catalysts are used as the material for all of the metal components.

In the following, the influence of the end face loading and the specific enthalpy flow on the continuous generation of the ammonia is set out, the ammonia gas generator from example 1 having been used. These generators were operated with a 60% guanidinium formate solution and with a 32.5% aqueous urea solution as well as with mixtures of the two. In this context, the results for these ammonia precursor solutions are approximately identical (±1%).

TABLE 1

Processes according to the end face loading

|  | V1 | V2 | V3 | V4 | V5 |
| --- | --- | --- | --- | --- | --- |
| Distance from nozzle opening to catalyst end face [mm] | 100 | 100 | 100 | 100 | 100 |
| Spray cone diameter [mm] | 54 | 54 | 54 | 54 | 54 |
| Metering mass flow of the solution of the ammonia precursor substance per hour [g/h] | 50 | 160 | 280 | 4 | 400 |
| Catalyst end face loading per hour [g/(h * cm$^2$)] | 2.1 | 7.0 | 12.0 | 0.17 | 17.5 |
| Specific enthalpy flow | 8000 | 12000 | 16000 | 16000 | 16000 |
| Ammonia formation level AG [%] | ≥95% | ≥95% | ≥95% | ≥95% | <90% |
| Depositions on catalyst end face | none | none | none | none | yes |
| Depositions on the mixing wall chamber | none | none | none | none | none |

By setting the catalyst end face loading to at least 0.17 g/(h*cm$^2$) (cf. V4), a process can be provided in which depositions are also not formed over a time period of >100 h. Even if the end face loading is 2.1 g/(h*cm$^2$) or 7.0 g/(h*cm$^2$) or 12.0 g/(h*cm$^2$) over a time period of >100 h, no depositions are observed, a continuous process being ensured thereby. If the end face loading is set to a value of 17.5 g/(h*cm$^2$) (cf. V5), depositions on the catalyst end face are observed. A continuous process is thus no longer possible.

Figure 4:
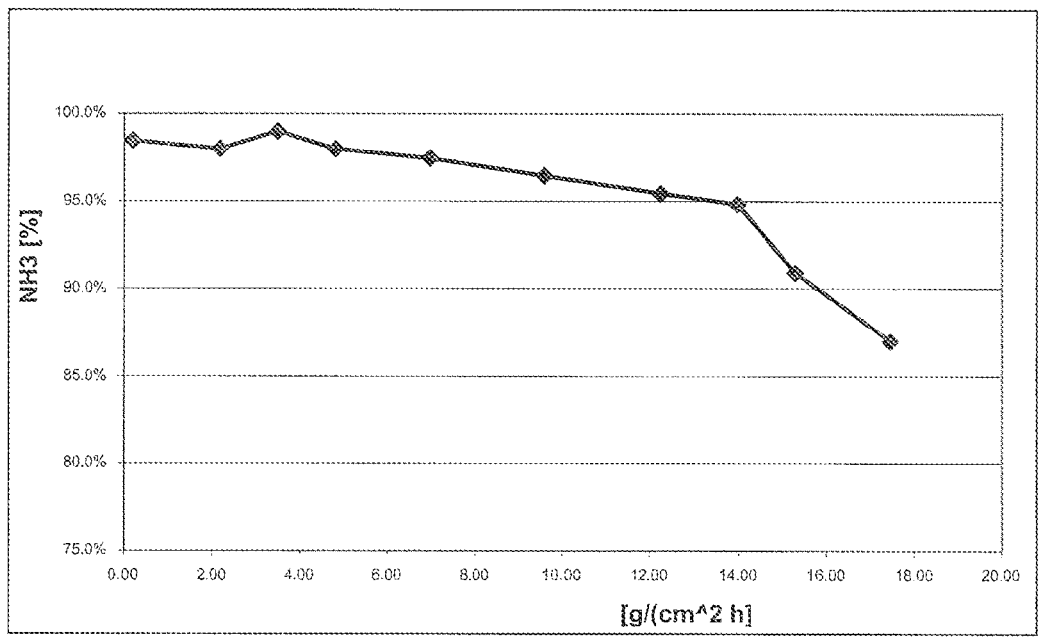
FIG. 4 shows a diagram 1 of the conversion of the ammonia precursor solution into ammonia according to the end face loading.

The formation of ammonia according to the end face loading is reproduced in FIG. 4.

TABLE 2

Processes according to the specific enthalpy flow

|  | V1 | V2 | V3 | V4 | V5 |
| --- | --- | --- | --- | --- | --- |
| Distance from nozzle opening to catalyst end face [mm] | 100 | 100 | 100 | 100 | 100 |
| Spray cone diameter [mm] | 54 | 54 | 54 | 54 | 54 |
| Metering mass flow of the solution of the ammonia precursor substance per hour [g/h] | 160 | 160 | 160 | 160 | 160 |
| Catalyst end face loading per hour [g/(h * cm$^2$)] | 7.0 | 7.0 | 7.0 | 7.0 | 7.0 |
| Specific enthalpy flow [kJ/kg] | 8000 | 12000 | 16000 | 2000 | 20000 |
| Ammonia formation level AG [%] | ≥95% | ≥95% | ≥95% | <90% | ≥95% |
| Depositions on catalyst end face | none | none | none | yes | none |
| Depositions on the mixing wall chamber | none | none | none | yes | none |

Figure 5:
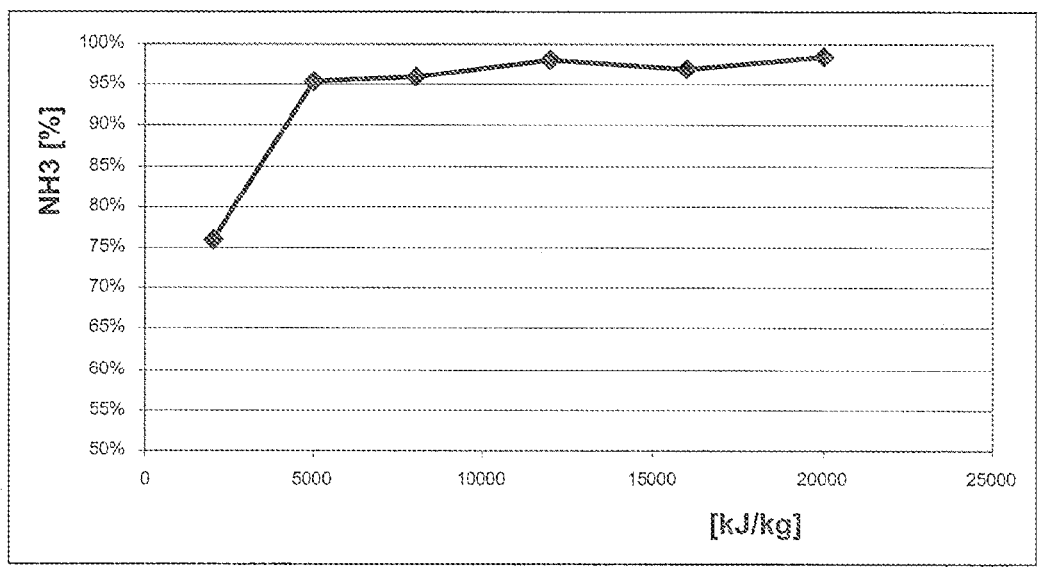
FIG. 5 shows a diagram 2 of the conversion of the ammonia precursor solution into ammonia according to the specific enthalpy flow.

By setting the specific enthalpy to at least 8000 kJ/kg (cf. V1, V2, V3 and V5), a process can be provided in which depositions are also not formed over a time period of >100 h, it being possible to provide a continuous process thereby. If the specific enthalpy is set to 2000 kJ/kg (cf. V4), depositions on the mixing chamber wall and the catalyst end face are observed. The formation of ammonia according to the specific enthalpy flow is reproduced in FIG. 5.

The operating parameters which should be adhered to during operation of the ammonia gas generator are specified in the following.

TABLE 3

Overview of further operating parameters

| Name | Formula | Unit | Range from | average | to |
|---|---|---|---|---|---|
| Carrier gas mass flow | $m_{Abα}$ | [kg/h] | 1 | 5 | 10 |
| Atomisation air mass flow | $m_D\ddot{u}_{se}$ | [kg/h] | 0.14 | 0.71 | 1.43 |
| Heating energy | $E_{Heiz}$ | [J/s] = [W] | 0 | 70 | 150 |
| Catalyst end face temperature | $T_{ein}$ | [° C.] | 280 | 350 | 500 |
| Catalyst outlet temperature | $T_{aus}$ | [° C.] | 250 | 320 | 450 |
| Catalyst space velocity | RG | [1/h] | 5000 | 15000 | 30000 |
| Metering pressure of the liquid | $P_{Red}$ | [bar] | 1 | 2 | 8 |

PRACTICAL EXAMPLE 2

In practical example 2, the reactor is configured in such a way that the reactor is additionally heated in part as a result of counter flow heat exchange by the supplied hot carrier gas stream. In this context, the carrier gas stream is initially passed below the reactor head, via a double casing, counter to the flow direction in the inside of the double casing, to the reactor wall, and flows around said wall on the way to the reactor head. At the reactor head, the primary flow from the reactor double casing enters the reactor interior from the reactor double casing via a plurality of holes or alternatively via an annular gap in the region of the nozzle at the reactor head. In addition, an electrical resistance heater may be located in the double casing.

PRACTICAL EXAMPLE 3

In practical example 3, the reactor is configured in such a way that the reactor is heated from the outside by heat exchange with hot components of a combustion engine or of a separate burner for exhaust heating or by hot gas flows, rather than by means of an electrical resistance heater. In this context, the heat can also be transported to the reactor via a heating tube over some distance.

PRACTICAL EXAMPLE 4

In practical example 4, the reactor is configured in such a way that heat is supplied directly in the interior of the reactor by means of an electrically heatable Emikat catalyst from Emitec, instead of the reactor being heated from the outside. Alternatively heat can be generated in the reactor by glow plugs, model Champion (60 W, 11 V).

PRACTICAL EXAMPLE 5

With preheating of the liquid solution of the ammonia precursor substance—when an injector having critical superheating (flash evaporator) is used.

The invention claimed is:

1. A method for continuously generating ammonia for introducing into an exhaust gas line, wherein the ammonia is generated from a solution of an ammonia precursor substance using an ammonia gas generator, the generator comprising a catalyst unit and a mixing chamber, the catalyst unit comprising a heated catalyst for at least one of decomposing and hydrolysing ammonia precursor substances into ammonia, and the mixing chamber being upstream from the catalyst in a flow direction, the catalyst having a catalyst volume and the mixing chamber having a mixing chamber volume, the method comprising:
introducing the solution of the ammonia precursor substance into the mixing chamber together with a carrier gas, the carrier gas and an optionally further additional energy source having a combined specific enthalpy flow of 8000-50000 kJ/kg with respect to a mass flow of the solution, such that an end face loading of the catalyst is 3.0 to 15 g/(h*cm$^2$), wherein the ammonia gas generator is separate from the exhaust gas line.

2. The method of claim 1, further comprising:
introducing the carrier gas into the mixing chamber separately from introducing the solution of the ammonia precursor substance.

3. The method of claim 1, further comprising:
introducing the carrier gas into the mixing chamber separately from introducing the solution of the ammonia precursor substance and introducing the carrier gas tangentially to the solution of the ammonia precursor substance.

4. The method of claim 2, wherein the carrier gas comprises a partial stream of an exhaust, the partial stream containing less than 5 vol. % of a total exhaust.

5. The method of claim 1, wherein introducing the solution of the ammonia precursor substance further comprises spraying the solution into the mixing chamber from a reservoir container by a nozzle having a spray angle of 10° to 40°.

6. The method of claim 1, wherein introducing the solution of the ammonia precursor substance further comprises injecting the solution at a pressure of at least 0.5 bar; and further comprising:
injecting atomisation air at a pressure of 0.5 to 2 bar.

7. The method of claim 1, further comprising:
applying the solution of the ammonia precursor substance to the end face of the catalyst in the form of droplets having droplet diameters of less than 20 μm.

8. The method of claim 1, further comprising:
introducing the carrier gas and atomisation air, wherein a volume ratio of the carrier gas to the atomisation air is 7:1 to 10:1.

9. The method of claim 1, wherein introducing the solution of the ammonia precursor substance further comprises:
spraying the solution into the mixing chamber perpendicular to the catalyst end face.

10. A method for reducing nitrogen oxides in exhaust from at least one of industrial facilities, combustion engines, gas engines, diesel engines, and petrol engines, the method comprising:
(i) providing an ammonia gas generator comprising a catalyst unit that comprises:

(a) a heated catalyst for at least one of decomposing or hydrolysing ammonia precursor substances into ammonia, and (b) a mixing chamber upstream from the catalyst in a flow direction, the catalyst being of a catalyst volume and the mixing chamber being of a mixing chamber volume; and introducing a solution of an ammonia precursor substance into the mixing chamber together with a carrier gas, the carrier gas and an optionally further additional energy source having a combined specific enthalpy flow of 8000-50000 kJ/kg with respect to a mass flow of the solution, such that an end face loading of the catalyst is 3.0 to 15 g/(h*cm$^2$), wherein the ammonia gas generator is separate from an exhaust gas line; and (ii) introducing the ammonia generated using the ammonia gas generator into the exhaust gas line.

11. The method of claim 1, wherein a ratio of the mixing chamber volume to the catalyst volume is 1.5:1 to 5:1.

12. The method of claim 1, wherein introducing the solution of the ammonia precursor substance further comprises:

spraying the solution such that a spray cone diameter upon incidence on the catalyst end face is at least 80% and at most 98% of a diameter of the catalyst end face.

13. A method for continuously generating ammonia for introduction into an exhaust gas line, wherein the ammonia is generated from a solution of an ammonia precursor substance using an ammonia gas generator, the ammonia gas generator comprising a catalyst unit, the catalyst unit comprising a heated catalyst for at least one of decomposing or hydrolysing ammonia precursor substances into ammonia, and a mixing chamber upstream from the catalyst in a flow direction, the catalyst having a catalyst volume and the mixing chamber having a mixing chamber volume, the method comprising:

spraying the solution of the ammonia precursor substance into the mixing chamber together with a carrier gas, the carrier gas and an optionally further additional energy source having a combined specific enthalpy flow of 8000-50000 kJ/kg with respect to a mass flow of the solution, such that an end face loading is 1.0 to 15 g/(h*cm$^2$), and such that a spray cone diameter of the solution upon incidence on an end face of the catalyst is at least 80% and at most 98% of a catalyst end face diameter, wherein the ammonia gas generator is separate from the exhaust gas line.

14. A method for continuously generating ammonia for introduction into an exhaust gas line, wherein the ammonia is generated from a solution of an ammonia precursor substance by an ammonia gas generator, the ammonia gas generator comprising a catalyst unit, the catalyst unit comprising a heated catalyst for at least one of decomposing or hydrolysing ammonia precursor substances into ammonia, and a mixing chamber upstream from the catalyst in a flow direction, the catalyst having a catalyst volume and the mixing chamber having a mixing chamber volume, the method comprising:

spraying the solution of the ammonia precursor substance into the mixing chamber together with a carrier gas, the carrier gas and an optionally further additional energy source having a combined specific enthalpy flow of 8000-50000 kJ/kg with respect to a mass flow of the solution, such that a spray cone diameter of the solution upon incidence on an end face of the catalyst is at least 80% and at most 98% of a catalyst end face diameter, wherein the ammonia gas generator is separate from the exhaust gas line.

15. The method of claim 1, wherein the mixing chamber is bounded at one end by a catalyst end face of the catalyst.

16. The method of claim 1, wherein the catalyst comprises a catalyst end face that is an entry face for the catalyst; and further comprising:

passing the solution of the ammonia precursor substance through the catalyst.

17. The method of claim 1, further comprising:

passing ammonia gas generated by the ammonia gas generator from an outlet of the ammonia gas generator to the exhaust gas line.

* * * * *